(12) United States Patent
Petersson

(10) Patent No.: US 6,375,772 B1
(45) Date of Patent: Apr. 23, 2002

(54) METHOD FOR FASTENING BUTTONS BY WELDING AND A DEVICE FOR MAKING SAID METHOD

(76) Inventor: Bengt Petersson, Stutaliden 33, S-434 94, Vallda (SE)

( * ) Notice: Subject to any disclaimer, the term of this patent is extended or adjusted under 35 U.S.C. 154(b) by 0 days.

(21) Appl. No.: 09/423,774

(22) PCT Filed: May 13, 1998

(86) PCT No.: PCT/SE98/00880

§ 371 Date: Nov. 10, 1999

§ 102(e) Date: Nov. 10, 1999

(87) PCT Pub. No.: WO98/51174

PCT Pub. Date: Nov. 19, 1998

(30) Foreign Application Priority Data

May 13, 1997 (SE) ............................................... 9701757
Jul. 29, 1997 (SE) ............................................... 9702814
Oct. 10, 1997 (SE) ............................................... 9703708

(51) Int. Cl.[7] ............................. B32B 7/08; D05B 3/12

(52) U.S. Cl. ................................ 156/88; 156/93; 2/265
(58) Field of Search ................................ 2/265; 156/93, 156/88; 24/90.5, 114.6; 112/475.15

(56) References Cited

U.S. PATENT DOCUMENTS 3,816,200 A   6/1974   McKenna
4,120,054 A   10/1978   Lemelson

FOREIGN PATENT DOCUMENTS

| JP | 233308 | 2/1990 |
| JP | 9256213 | 3/1996 |
| SE | 416612 | 1/1981 |

*Primary Examiner*—Jeff H. Aftergut
*Assistant Examiner*—Todd J. Kilkenney
(74) *Attorney, Agent, or Firm*—Orum & Roth

(57) ABSTRACT

A method of fastening buttons by welding whereby a fusing device is used upon an accumulation of button threads thereby to create a substantially smooth surface. A device for using the method includes a thermal mandrel which may have a cutting surface on its outer edge. Multiple mandrels may be used to simultaneously fuse multiple buttons.

13 Claims, 2 Drawing Sheets

METHOD FOR FASTENING BUTTONS BY WELDING AND A DEVICE FOR MAKING SAID METHOD

The present invention relates to a method for attaching buttons with thread to clothes, textiles and similar by sewing on the buttons with a thread.

Buttons that are attached to clothes such as shirts and blouses or other intended items with the help of sewing thread in an industrial mass-production process are never attached effectively to the fabric as a rule because the upper sewing thread, the upper thread, which is introduced with the help of a sewing machine down into separate holes in the button, is not securely locked with the help of an under sewing thread, the under thread, for a sufficient number of loops, but this important attachment of the button to the textile is performed negligently, so that the sewing thread unravels and the button becomes detached if one pulls on a loose end of the thread.

Discomfort may also be caused by the sewing thread used for buttons, because the accumulation of thread on the inside of the fabric may be perceived as sharp and uncomfortable against the skin. This problem arises in particular after starting to sew with a synthetic sewing thread, when the end of the thread jabs into the skin.

Previously disclosed is the procedure whereby buttons are attached with the help of synthetic thread by twinning the thread to form a grip around the thread with which the button was first sewn in place, and by then fusing the threads together between the button and the fabric from the side to form a neck on the button. See, for example, GB, 2 236 046 A.

Also previously disclosed is the procedure whereby buttons are welded in place with the help of loose plastic hooks, although in this case a large accumulation of plastic material is formed on the inside of the fabric and thus faces towards the wearer of the garment. This may be uncomfortable if the garment is a shirt or a blouse, and if the button attachment comes into direct contact with the body and chafes.

The principal object of the present invention is thus, in the first instance, to make available a simple and effective method for solving the aforementioned problems.

Said object is achieved by means of a method in accordance with the present invention, which is characterized essentially in that a fusing device is used to fuse together a piece of material, which at least in part consists of synthetic fibre material, and the accumulation of threads situated on the opposite side of the fabric, etc., to that on which the button is sewn, and in that said accumulation of threads and the piece of synthetic fibre material are influenced by a stop to form an essentially smooth surface.

The invention also relates to an arrangement for the execution of a method for attaching buttons with thread to clothes, textiles and similar by sewing on the buttons with a thread.

A further object of the present invention is thus to make available an arrangement of the kind referred to above, which, in an effective and simple fashion, performs the task of executing a button attachment method in accordance with the invention.

Said further object is achieved by means of an arrangement in accordance with the present invention, which is characterized essentially in that a fusing device is so arranged as to be capable of being positioned on that side of the fabric, etc., to which the button is sewn, and in that the fusing device is so arrange as to be capable of fusing together a piece of material, which at least in part consists of synthetic fibre material, on top of said accumulation of threads on the opposite side of the fabric, etc., to which the button is attached.

The invention is described below as a preferred illustrative embodiment with reference to the accompanying drawings, in which FIG. 1 shows a sectioned view of a welding apparatus that attaches the buttons to the garment;

Figure 1:
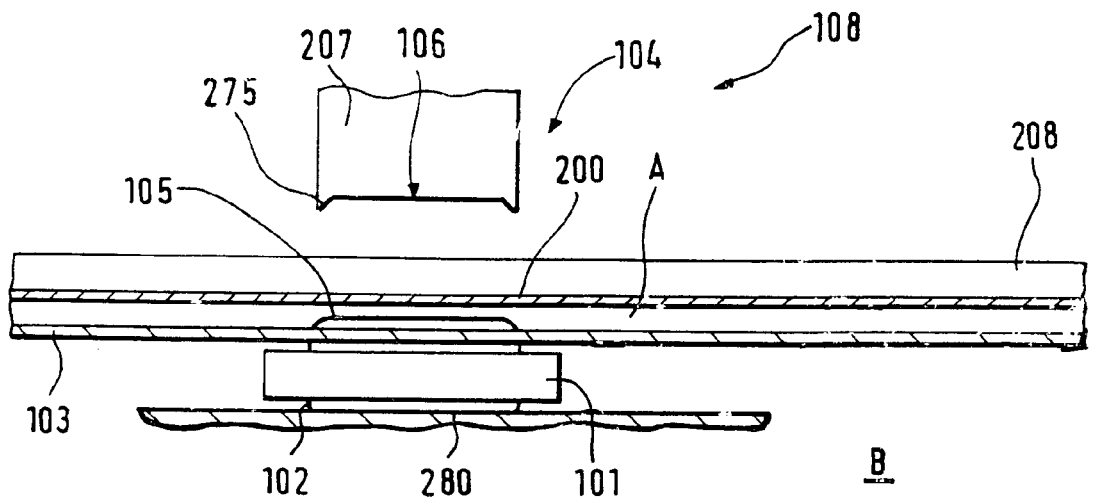

A method for attaching buttons 101 with thread 102 to clothes 103, textiles such as pillow cases, bags and similar by sewing on the buttons with a thread 102 and a piece 200 of material, which at least in part consists of synthetic fibre material, proceeds in such a way that a thread fusing arrangement 104 is used to fuse together the piece 200 of synthetic fibre material that is situated on the opposite side A of the fabric to the side B to which the button 101 is sewn. Said piece 200 of material is also caused 30 to be influenced by means of a welding mandrel 207 to form a flat, thin disc on top of the simultaneously flattened accumulation 105 of threads, which exhibits an essentially smooth surface that is situated on the inside of the garment and is perceived by the wearer as a part of the garment without chafing and irritation, which means that the button is securely attached. If it is wished to remove the button 101, it is easiest to part the threads 102 on the outside of the garment and to pull the threads 102 from the garment 103 from behind.

Fusing together of the piece 200 of material and compression of the accumulation 105 of threads is appropriately executed as a combined operation and preferably only once the sewing-on of a button 101 is totally complete.

Figure 2:
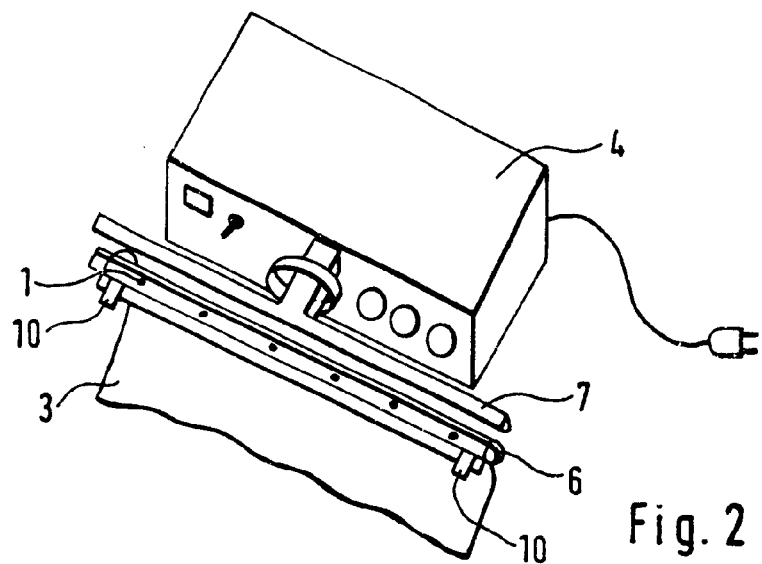
FIG. 2 shows a perspective view of an impulse welding apparatus with a rail for guiding the buttons into the correct position before fusing the sewing thread.
Figure 3:
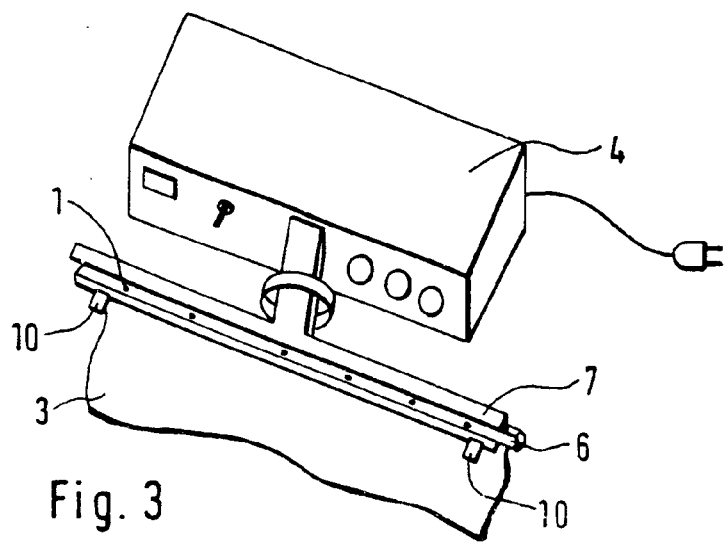
FIG. 3 shows the position when fusing the sewing thread.
Figure 4:
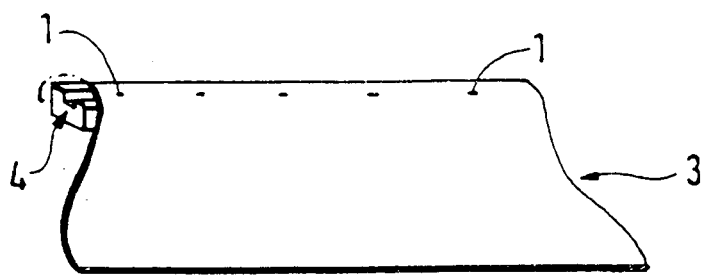
FIG. 4 shows the rail with a groove for the buttons and a gripper for the textile garment.

It is possible effectively to weld a number of sewn-on buttons 101 in a row at the same time, as illustrated in FIGS. 2–4.

Said fusing together is achieved by the transfer of heat to the piece 200 of material and the accumulation 105 of threads and the area around it via a heat transfer component 207 functioning as a welding mandrel and capable of being forced against the accumulation 105 of threads.

Figure 5:
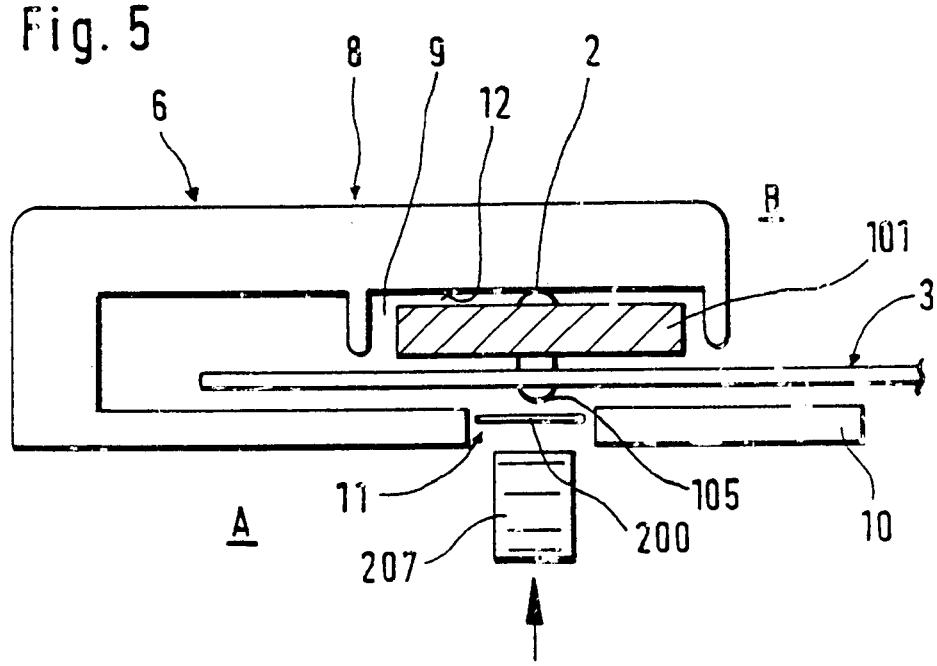
FIG. 5 shows a sectioned view of the rail during the active fusing phase.
Figure 6:
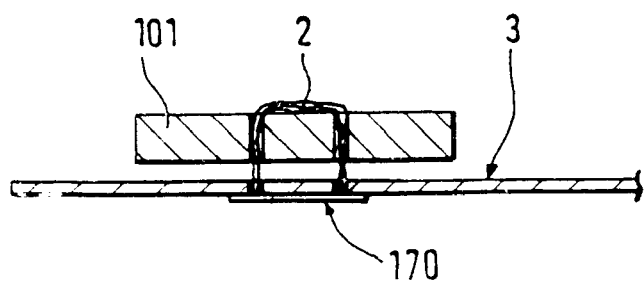
FIG. 6 shows a section through a finished, attached button.

An arrangement in accordance with the present invention comprises means for fusing together the piece 200 of material, which entirely or in part consists of synthetic fibre material, on the rear side of the buttons 101 with the fabric in between. See, for example, FIG. 5.

The arrangement that fuses together said piece 200 of material can preferably function with impulse welding, which permits rapid attachment of the piece 200 of material on top of the sewing thread 105, which can itself consist of synthetic material and can be so arranged that a number of buttons and their sewing threads are attached in a single operation and are capable of being used rationally and industrially. At the same time, this permits a smooth surface 170 to be achieved, instead of the small raised area that is normally formed by the thread and can be a little irritating against the skin.

More specifically an arrangement 108, see FIG. 1, that is adapted to execute a method for the attachment of buttons 101 with thread 102 to clothes 103, textiles and other similar items by sewing on the buttons 101 with a thread 102, has a fusing arrangement 207 so arranged as to be capable of fusing a piece 200 of material, which at least in part consists of synthetic fibre material, on the opposite side A of the fabric to that on which the button 101 is sewn, or is in the process of being sewn, on top of the thread 105. The fusing arrangement 207, i.e. at least its effective fusing part, is so arranged as to be capable of being positioned on said side A of the fabric, etc. A stop 280 situated on the opposite side B of the fabric from the button 101 is arranged in this case to form a holder relative to said fusing arrangement 207, and thus also the existing accumulation 105 of threads, in order to compress the piece 200 of material on top of the accumulation 105 of threads to form a flat body which exhibits an essentially smooth surface on the accumulation 105 of threads.

The arrangement can include a fusing arrangement 4 resembling a ruler and a pressure stop 6 in a common system, which perform a common operation. The fusing arrangement 4 and the pressure stop 6 are appropriately formed from pairs of long rails, one of which exhibits a channel-shaped guide component 9 for each button that is so arranged as to be introduced therein in a row and to be retained in the desired secured position with the help of grippers 10, which hold the garment 103 to the rail until the welding period has elapsed and the buttons 101 are securely fused in an effective and simple fashion to the garment 103, and in such a way that they do not become loose so readily. The second rail 7 is formed by a welding ruler which operates through impulse welding or through some other appropriate welding method or thermal welding method.

The two rails 7, 6 can be so arranged as to be compressed against one another for the purpose of fusing the piece 200 of material and pressing out the thread 102, and at least so that one of the rails 7, 6 is movable across its longitudinal sense relative to the second of the two rails 7, 6.

The guide rail 9 exhibits a support surface 10 enabling it to carry the edge of the textile garment, etc., in conjunction with which an opening 11 via said support surface 10 permits the welding ruler 7 to fuse the piece 200 of material and to compress the accumulation 105 of threads at the respective button 101. A counter-pressure component 12 is provided for the buttons 101 for the period during which welding of the piece 200 of material and compression of said accumulation 105 of threads takes place.

The welding mandrel 207 can preferably exhibit a cutting edge 275 around its periphery.

A strip 208 of Teflon material or other similar material is intended to be capable of being placed between the piece 200 of material, which in turn can be formed from a strip of plastic film, and the welding mandrel 207 to prevent adhesion of the plastic material thereon. The welding mandrel 207 can alternatively be provided with a Teflon coating for the same purpose.

The invention should also have been appreciated with regard to its function from the above description. The invention is not restricted to the illustrative embodiment referred to and described above, but may be varied within the scope of the Patent Claims without departing from the idea of invention.

What is claimed is:

1. Method for attaching buttons with thread to clothes and fabric having a button side and an opposite side by sewing the buttons onto the button side with a thread, characterized in that a fusing device is used to fuse together a piece of material, which at least in part consists of synthetic fiber material, and an accumulation of threads situated on the opposite side of the fabric, and in that said accumulation of threads and the piece of material are influenced by a stop to form a substantially smooth surface.

2. Method as claimed in claim 1, characterized in that fusion and compression of the accumulation of threads and the piece of material are executed as a combined operation only once the sewing is totally complete.

3. Method as claimed in claim 3, wherein the accumulations of threads for a number of sewn-on buttons are caused to fuse together at the same time.

4. Method as claimed in claim 3, wherein the fusing together is achieved by the transfer of heat via a thermal welding mandrel capable of being forced against the accumulation of threads and the piece of material.

5. Method as claimed in claim 4, wherein the fusion and a cutting of the piece of material are executed as a combined operation.

6. Method as claimed in claim 5, wherein a piece of material consisting of synthetic fibre material is placed on top of the accumulation of threads, and the material is securely welded and cut through by means of a polytetrafluoroethylene-coated welding mandrel, or wherein a polytetrafluoroethylene film is placed on top of the piece of material as a protection, whereupon welding and stamping are executed.

7. Arrangement for attaching buttons with thread to clothes and fabric by sewing on the buttons with a thread, characterized in that a fusing device is so arranged as to be capable of being positioned on that side of the fabric to which the buttons are sewn, and in that the fusing device is so arranged as to be capable of fusing together a piece of material, which at least in part consists of synthetic fiber material, on top of an accumulation of threads on the opposite side of the fabric to which the buttons are attached, said fusing device including a thermal welding mandrel which acts to securely weld and cut the piece of material, and in that a pressure stop is arranged to influence the accumulation of threads and piece of material to form a substantially smooth surface.

8. Arrangement as claimed in claim 7, wherein the fusing device and the pressure stop are part of a common system and perform a common operation.

9. Arrangement as claimed in claim 8, wherein the fusing device and the pressure stop are formed from pairs of long rails, one of which exhibits a channel-shaped guide component for each button that is so arranged as to be introduced therein in a row and to be retained in a desired secured position with the help of grippers, and another is formed by a welding ruler which operates through impulse welding.

10. Arrangement as claimed in claim 9, wherein the pairs of rails are so arranged as to be compressed relative to one another for the purpose of fusing and pressing out the piece of material on the accumulation of threads.

11. Arrangement as claimed in claim 10, wherein the guide rail exhibits a support surface enabling it to carry the edge of the fabric and in that an opening through said support surface permits the welding ruler to fuse and compress the pieces of material with the accumulation of threads at the respective button, in conjunction with which an internal part of the guide rail forms a counter-pressure component for the buttons for the period during which welding and compression takes place.

12. Arrangement as claimed in claim 11, wherein a welding mandrel exhibits a cutting edge around its periphery.

13. Arrangement as claimed in claim 12, wherein a strip of polytetrafluoroethylene material is intended to be capable of being placed between the piece of material and the welding mandrel to prevent adhesion thereon.

* * * * *